United States Patent
Zhao et al.

(10) Patent No.: US 11,125,906 B2
(45) Date of Patent: Sep. 21, 2021

(54) MILLIMETER WAVE IMAGING-BASED OMNI-DIRECTIONAL SECURITY DETECTION SYSTEM

(71) Applicants: CHINA COMMUNICATION TECHNOLOGY CO., LTD., Shenzhen (CN); SHENZHEN VICTOOTH TERAHERTZ TECHNOLOGY CO., LTD., Shenzhen (CN)

(72) Inventors: Shukai Zhao, Shenzhen (CN); Chunchao Qi, Shenzhen (CN); Zhihui Feng, Shenzhen (CN); Hanjiang Chen, Shenzhen (CN)

(73) Assignees: CHINA COMMUNICATION TECHNOLOGY CO., LTD., Shenzhen (CN); SHENZHEN VICTOOTH TERAHERTZ TECHNOLOGY CO., LTD., Shenzhen (CN)

( * ) Notice: Subject to any disclaimer, the term of this patent is extended or adjusted under 35 U.S.C. 154(b) by 315 days.

(21) Appl. No.: 16/326,305

(22) PCT Filed: Dec. 15, 2016

(86) PCT No.: PCT/CN2016/110009
§ 371 (c)(1),
(2) Date: Feb. 18, 2019

(87) PCT Pub. No.: WO2018/032669
PCT Pub. Date: Feb. 22, 2018

(65) Prior Publication Data
US 2019/0187327 A1 Jun. 20, 2019

(30) Foreign Application Priority Data
Aug. 18, 2016 (CN) .......................... 201610686275.4

(51) Int. Cl.
*G01V 8/00* (2006.01)
*G01S 13/89* (2006.01)
(Continued)

(52) U.S. Cl.
CPC .............. *G01V 8/005* (2013.01); *G01S 13/87* (2013.01); *G01S 13/887* (2013.01); *G01S 13/89* (2013.01)

(58) Field of Classification Search
CPC ......................................... G01S 13/88–13/888
See application file for complete search history.

(56) References Cited

U.S. PATENT DOCUMENTS 4,975,968 A * 12/1990 Yuki ..................... G01S 13/887
382/100
5,170,170 A * 12/1992 Soumekh ............ G01S 15/8904
342/179
(Continued)

FOREIGN PATENT DOCUMENTS

CN 102393536 A 3/2012
CN 104375193 A 2/2015
(Continued)

*Primary Examiner* — Peter M Bythrow
(74) *Attorney, Agent, or Firm* — Maier & Maier, PLLC

(57) ABSTRACT

A disclosed system includes a support frame including a plurality of surfaces, a millimeter-wave transmission link that generates a millimeter-wave transmission signal, a plurality of millimeter-wave array antennas, a millimeter-wave reception link, and an image processing device. The millimeter-wave array antennas are disposed on different surfaces of the support frame, and transmit millimeter-wave transmission signals from different angles to a to-be-detected object and receive echo signals reflected from the to-be-detected object. By providing the millimeter-wave array antennas on each of the plurality of surfaces of the support frame, and transmitting millimeter-wave transmission signals from different angles to a to-be-detected object (Continued)

and receiving echo signals reflected from different angles of the to-be-detected object, a three-dimensional image of the to-be-detected object can be established, thereby achieving omni-directional detection of the to-be-detected object. The system can detect human and objects at the same time, and is convenient, quick and highly accurate.

9 Claims, 1 Drawing Sheet

(51) Int. Cl.
*G01S 13/87* (2006.01)
*G01S 13/88* (2006.01)

(56) References Cited

U.S. PATENT DOCUMENTS

| | | | | |
|---|---|---|---|---|
| 5,455,590 | A * | 10/1995 | Collins | G01S 13/887 342/179 |
| 5,859,609 | A * | 1/1999 | Sheen | G01S 7/412 342/179 |
| 6,057,761 | A * | 5/2000 | Yuki | A61B 5/0507 250/358.1 |
| 6,937,182 | B2* | 8/2005 | Lovberg | G01S 13/887 342/179 |
| 6,965,340 | B1* | 11/2005 | Baharav | G01S 13/89 342/22 |
| 7,183,963 | B2* | 2/2007 | Lee | G01N 22/00 342/175 |
| 7,248,204 | B2* | 7/2007 | Lovberg | G01V 8/005 342/179 |
| 7,583,221 | B2* | 9/2009 | Detlefsen | G01S 13/887 342/25 A |
| 7,948,428 | B2* | 5/2011 | Lovberg | H01Q 3/2694 342/22 |
| 8,345,918 | B2* | 1/2013 | Fleisher | G01S 13/887 382/103 |
| 9,316,732 | B1* | 4/2016 | Mohamadi | H01Q 21/061 |
| 9,658,320 | B2* | 5/2017 | Gumbmann | G01S 7/024 |
| 9,891,314 | B2* | 2/2018 | Morton | G01S 13/87 |
| 10,261,177 | B2* | 4/2019 | Ahmed | G01S 13/887 |
| 10,295,664 | B2* | 5/2019 | Valdes | G01S 13/003 |
| 2003/0118216 | A1* | 6/2003 | Goldberg | G07F 17/26 382/115 |
| 2004/0080315 | A1* | 4/2004 | Beevor | G01V 3/104 324/244 |
| 2004/0080448 | A1* | 4/2004 | Lovberg | G01V 8/005 342/22 |
| 2004/0090359 | A1* | 5/2004 | McMakin | G01S 13/89 342/22 |
| 2004/0140924 | A1* | 7/2004 | Keller | G01S 13/887 342/22 |
| 2005/0093733 | A1* | 5/2005 | Lovberg | G01V 8/005 342/22 |
| 2005/0110672 | A1* | 5/2005 | Cardiasmenos | G01N 21/3581 342/27 |
| 2005/0230604 | A1* | 10/2005 | Rowe | G01S 13/887 250/221 |
| 2005/0231415 | A1* | 10/2005 | Fleisher | G01S 13/887 342/22 |
| 2005/0231417 | A1* | 10/2005 | Fleisher | G06K 9/00369 342/22 |
| 2005/0231421 | A1* | 10/2005 | Fleisher | G06K 9/00369 342/179 |
| 2005/0232459 | A1* | 10/2005 | Rowe | G01S 13/86 382/100 |
| 2006/0017605 | A1* | 1/2006 | Lovberg | G01K 7/226 342/22 |
| 2006/0066469 | A1* | 3/2006 | Foote | G01S 13/89 342/22 |
| 2006/0104480 | A1* | 5/2006 | Fleisher | G01S 13/89 382/103 |
| 2006/0164240 | A1* | 7/2006 | Patchell | G07C 9/00 340/552 |
| 2006/0214835 | A1* | 9/2006 | Lee | G01N 22/00 342/22 |
| 2007/0114418 | A1* | 5/2007 | Mueller | G01J 3/42 250/341.1 |
| 2007/0263907 | A1* | 11/2007 | McMakin | G06K 9/00369 382/115 |
| 2008/0116374 | A1* | 5/2008 | Ouchi | G01S 13/887 250/306 |
| 2008/0191925 | A1* | 8/2008 | Martin | G01V 8/005 342/22 |
| 2009/0073023 | A1* | 3/2009 | Ammar | G01S 17/89 342/22 |
| 2009/0322873 | A1* | 12/2009 | Reilly | G01S 13/89 348/143 |
| 2010/0214150 | A1* | 8/2010 | Lovberg | H01Q 3/06 342/22 |
| 2010/0220001 | A1* | 9/2010 | Longstaff | G01S 13/003 342/22 |
| 2010/0265117 | A1* | 10/2010 | Weiss | G01S 13/003 342/22 |
| 2010/0295725 | A1* | 11/2010 | Krozer | G01S 13/003 342/25 A |
| 2011/0043403 | A1* | 2/2011 | Loffler | G01S 13/887 342/25 A |
| 2011/0080315 | A1* | 4/2011 | Reilly | G01S 13/887 342/175 |
| 2011/0102597 | A1* | 5/2011 | Daly | G01S 13/887 348/162 |
| 2011/0164726 | A1* | 7/2011 | Mastronardi | G01V 5/0008 378/62 |
| 2012/0105267 | A1* | 5/2012 | DeLia | G01V 8/005 342/22 |
| 2012/0165647 | A1* | 6/2012 | Kang | G01S 13/867 600/407 |
| 2013/0022237 | A1* | 1/2013 | Kuznetsov | G01S 13/867 382/103 |
| 2013/0121529 | A1* | 5/2013 | Fleisher | G06K 9/78 382/103 |
| 2013/0169466 | A1* | 7/2013 | Frederick | G08B 13/248 342/22 |
| 2015/0048964 | A1* | 2/2015 | Chen | G01S 13/887 342/22 |
| 2015/0084645 | A1* | 3/2015 | Kayano | G01S 13/04 324/639 |
| 2015/0301167 | A1* | 10/2015 | Sentelle | G01S 13/888 342/22 |
| 2016/0216371 | A1* | 7/2016 | Ahmed | G01V 8/005 |

FOREIGN PATENT DOCUMENTS

| | | |
|---|---|---|
| CN | 104991283 | 10/2015 |
| CN | 105510911 A | 4/2016 |
| CN | 105510912 | 4/2016 |
| CN | 105572667 A | 5/2016 |
| CN | 105607056 | 5/2016 |
| CN | 105759269 | 7/2016 |
| JP | 2015114162 | 6/2015 |

* cited by examiner

MILLIMETER WAVE IMAGING-BASED OMNI-DIRECTIONAL SECURITY DETECTION SYSTEM

CROSS REFERENCE TO RELATED APPLICATIONS

This application is a National Stage Entry under 35 U.S.C. 371 of PCT Application No. PCT/CN2016/110009, filed Dec. 15, 2016, which claims priority to Chinese Patent Application No. 201610686275.4, filed Aug. 18, 2016, the entire contents of each of which are incorporated herein by reference.

TECHNICAL FIELD

Embodiments of the present disclosure relate to the technical field of millimeter wave detection, and more particularly, to a millimeter wave imaging-based omni-directional security detection system.

BACKGROUND

In the technical field of millimeter wave detection, there are active millimeter wave imaging and passive millimeter wave imaging. In the active millimeter wave imaging, a millimeter wave signal with some power is transmitted to a to-be-detected object, the signal reflected by the to-be-detected object is received, and the image information of the to-be-detected object is reconstructed. While in the passive millimeter wave imaging, a millimeter wave radiometer is configured to collect heat radiation or background scattering of the to-be-detected object to generate an image. Obviously, the active millimeter wave imaging is less influenced by environment factor, obtains more information, and generates images with better quality.

However, nowadays, an active millimeter wave imaging system is generally planar structure, which only detects a to-be-detected object from a fixed angle to generate a two-dimensional image for staff's inspection. For example, transmitting millimeter waves to the front of a person for security detection, if a banned item is hidden in the hair or heel of the person, it is probably that a clear image of the banned item cannot be shown in the generated two-dimensional image. Furthermore, a security inspection apparatus will not alarm if no banned item is detected.

SUMMARY

In view of the above, it is necessary to provide a millimeter wave imaging-based omni-directional security detection system to detect a to-be-detected object omni-directionally. The system can detect human and objects at the same time, and is convenient, quick and highly accurate.

A millimeter wave imaging-based omni-directional security detection system comprises:

a support frame, including a plurality of surfaces;

a millimeter-wave transmission link, configured to generate a millimeter-wave transmission signal;

a plurality of millimeter-wave array antennas, disposed on different surfaces of the support frame, configured to transmit millimeter-wave transmission signals from different angles to a to-be-detected object and receive echo signals reflected from the to-be-detected object;

a millimeter-wave reception link configured to process the echo signals and transform the echo signals to the image data of the to-be-detected object;

an image processing device configured to generate a three-dimensional image of the to-be-detected object according to the image data.

In one embodiment, the support frame comprises a bottom surface, a top surface, a first side face, and a second side face, each of which is disposed with an antenna substrate; the first side face, and the second side face are opposite; the plurality of millimeter-wave array antennas comprise a first millimeter wave array antenna disposed on the antenna substrate of the first side face, a second millimeter wave array antenna disposed on the antenna substrate of the second side face, a third millimeter wave array antenna disposed on the antenna substrate of the top surface, and a fourth millimeter wave array antenna disposed on the antenna substrate of the bottom surface; the millimeter-wave transmission link and the millimeter-wave reception link forms four sets of millimeter wave transceiving links, and each millimeter wave transceiving link is respectively disposed on the antenna substrate of each surface of the support frame.

In one embodiment, the omni-directional security detection system further comprises a drive device, a motion control device, and a plurality of guide rails; each guide rail is disposed on one surface of the support frame; each antenna substrate is disposed on one guide rail; the motion control device is configured to control the drive device to drive the antenna substrates of the plurality of millimeter wave array antennas to move along the guide rails.

In one embodiment, the guide rail on the bottom surface is parallel to the guide rail on the top surface, and the guide rail on the first side face is parallel to the guide rail on the second side face.

In one embodiment, the motion control device is also configured to control the antenna substrates of the first millimeter wave array antenna and the second millimeter wave array antenna to move along the guide rails oppositely, and control the antenna substrates of the third millimeter wave array antenna and the fourth millimeter wave array antenna to move along the guide rails oppositely.

In one embodiment, the motion control device is also configured to control the antenna substrates of the first millimeter wave array antenna and the second millimeter wave array antenna to move along the guide rails in sequence, and control the antenna substrates of the third millimeter wave array antenna and the fourth millimeter wave array antenna to move along the guide rails in sequence.

In one embodiment, the omni-directional security detection system further comprises a plurality of millimeter wave array switches, which are connected to the plurality of millimeter-wave array antennas correspondingly to control the turn-on and turn-off of each antenna of the plurality of millimeter-wave array antennas.

In one embodiment, the omni-directional security detection system further comprises a scanning control device, which is configured to control the plurality of millimeter wave array switches so that the plurality of millimeter-wave array antennas transmit the millimeter wave transmission signals in sequence according to preset time sequence or receive echo signals reflected from the to-be-detected object in sequence.

In one embodiment, the scanning control device is also configured to control the up and down millimeter wave array antennas formed by the first millimeter wave array antenna and the second millimeter wave array antenna and the left and right millimeter wave array antennas formed by the third millimeter wave array antenna and the fourth millimeter wave array antenna to transmit the millimeter wave transmission signals according to a preset time interval and receive the echo signals.

In one embodiment, the omni-directional security detection system further comprises a display, which is configured to display the three-dimensional image.

In one embodiment, the omni-directional security detection system further comprises an alarm device, which is configured to alarm when the omni-directional security detection system has detected a banned item carried by the to-be-detected object.

The millimeter wave imaging-based omni-directional security detection system provides the millimeter-wave array antennas on each of the plurality of surfaces of the support frame, and transmits millimeter-wave transmission signals from different angles to a to-be-detected object and receives echo signals reflected from different angles of the to-be-detected object; the millimeter-wave reception link is configured to process the echo signals to obtain image data of the to-be-detected object, and a three-dimensional image of the to-be-detected object can be obtained according to the image data, thereby achieving omni-directional detection of the to-be-detected object; the system can detect human and objects at the same time, and is convenient, quick and highly accurate.

BRIEF DESCRIPTION OF THE DRAWINGS

In order to illustrate the embodiments of this disclosure or the technical solutions of existing technologies more clearly, the appended drawings used to describe embodiments of this disclosure are introduced briefly below. Obviously, the embodiments described below are merely some embodiments of this disclosure. According to these drawings, persons skilled in the art can obtain drawings of other embodiments without paying creative effort.

DETAILED DESCRIPTION

In order to make the objective of this disclosure, the technical solution and advantages clearer, the present disclosure will be described fully below referring to the accompanying drawings and the embodiments. It should understand that, the embodiments described herein are merely used to explain this disclosure, and are not construed as a limit.

Unless otherwise defined, all the technical and scientific terminologies used herein have the same meanings that are commonly understood by persons skilled in the technical field of this disclosure. Terminologies used in the specification of this disclosure are for the purpose of describing the specific embodiments, not intended to limit this disclosure. The terminologies "and/or" used herein comprise any or all combinations of one or more related listed items.

Figure 1:
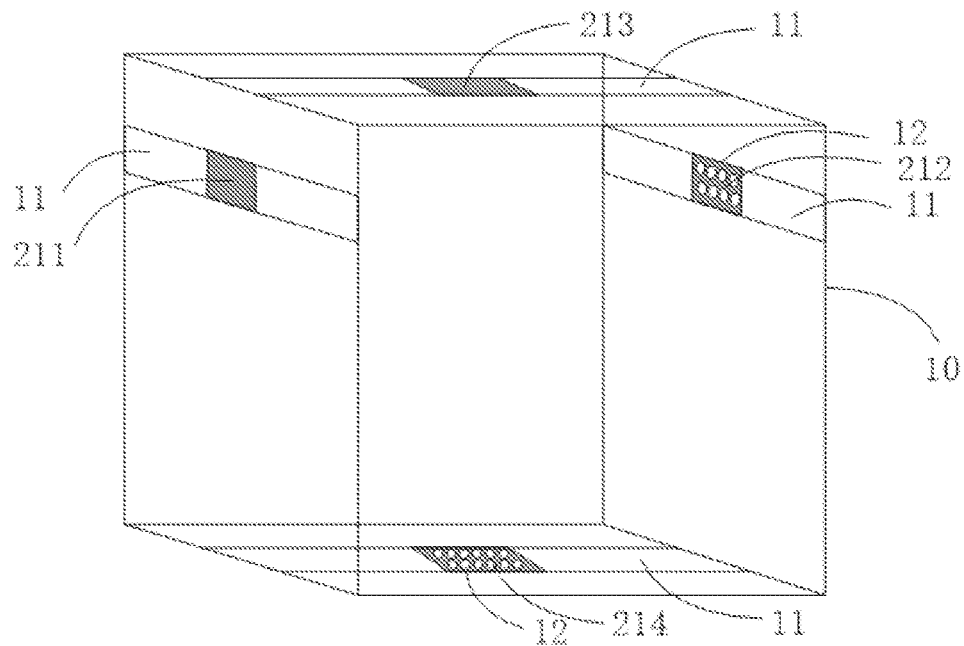
FIG. 1 illustrates a system structure diagram of the millimeter wave imaging-based omni-directional security detection system according to one embodiment.
Figure 2:
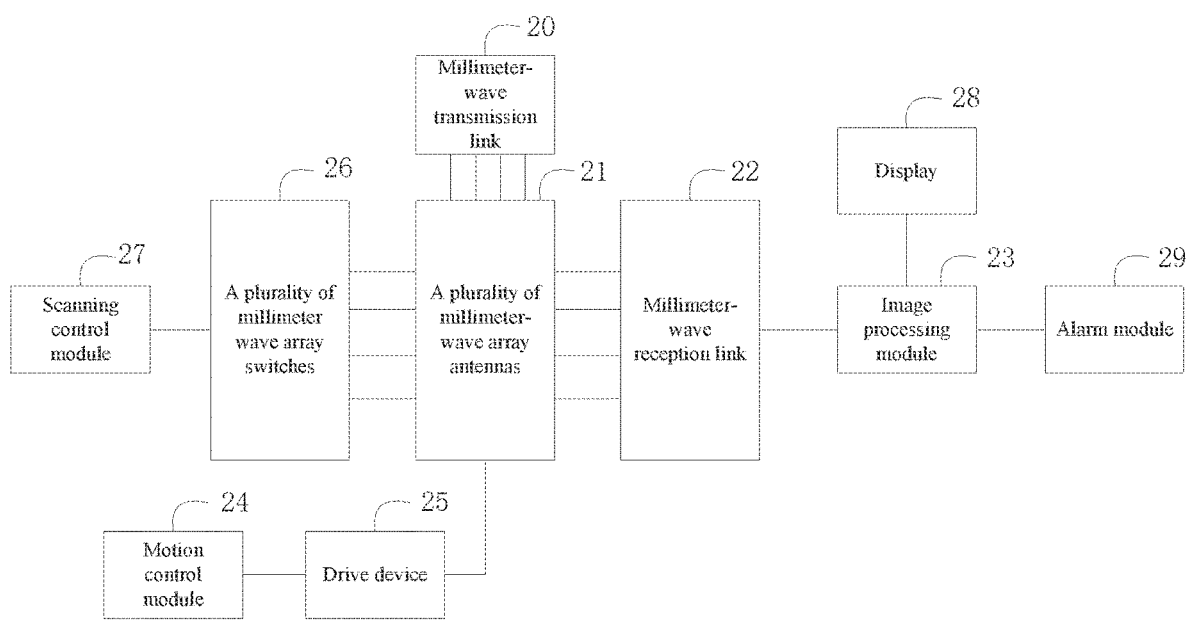
FIG. 2 illustrates a circuit structure diagram of the millimeter wave imaging-based omni-directional security detection system according to another embodiment.

Please refer to FIG. 1 and FIG. 2. FIG. 1 illustrates a system structure diagram of the millimeter wave imaging-based omni-directional security detection system according to one embodiment. FIG. 2 illustrates a circuit structure diagram of the millimeter wave imaging-based omni-directional security detection system according to another embodiment.

In this embodiment, the system structure diagram of the millimeter wave imaging-based omni-directional security detection system comprises a support frame 10, a millimeter-wave transmission link 20, a plurality of millimeter-wave array antennas 21, a millimeter-wave reception link 22, and an image processing device 23.

The support frame 10 comprises a plurality of surfaces, which are respectively bottom surface, top surface, a first side face, and a second side face. The support frame 10 may be a cuboid frame, wherein the bottom surface and the top surface are parallel, and the first side face and the second side face are two opposite side faces and are parallel.

The millimeter-wave transmission link 20 is configured to generate a millimeter wave transmission signal. The millimeter-wave transmission link 20 comprises a first signal source, a first directional coupler, a first power amplifier, and a frequency doubler. The output end of the first signal source is connected to the input end of the first directional coupler. The straight-through end of the first directional coupler is connected to the input end of the first power amplifier. The frequency doubler is connected between the output end of the first power amplifier and a transmission antenna. Millimeter wave signals transmitted by the millimeter-wave transmission link 20 are linear frequency modulation continuous wave with frequency range of 20 GHz to 40 GHz, which can accurately detect a to-be-detected object.

The pluralities of millimeter-wave array antennas 21 are disposed on different surfaces of the support frame 10. Each millimeter-wave array antenna is disposed on one surface of the support frame 10 for transmitting millimeter-wave transmission signals from different angles to a to-be-detected object and receiving echo signals reflected from different angles of the to-be-detected object.

The four surfaces of the support frame 10 are respectively disposed an antenna substrate 12. The plurality of millimeter-wave array antennas 21 comprise a first millimeter wave array antenna 211 disposed on the antenna substrate 12 of the first side face, a second millimeter wave array antenna 212 disposed on the antenna substrate 12 of the second side face, a third millimeter wave array antenna 213 disposed on the antenna substrate 12 of the top surface, and a fourth millimeter wave array antenna 214 disposed on the antenna substrate 12 of the bottom surface. The millimeter-wave transmission link 20 and the millimeter-wave reception link 22 forms four sets of millimeter wave transceiving links, and each millimeter wave transceiving link is respectively disposed on the antenna substrate 12 of each surface of the support frame 10.

Each millimeter array antenna comprises a plurality of transmission antennas and a plurality of receiving antennas.

The millimeter-wave reception link 22 is configured to process echo signals and transform the echo signals to the image data of the to-be-detected object. The millimeter-wave reception link 22 comprises a second signal source, a second directional coupler, a first mixer, a second mixer, a third mixer, a second power amplifier, a third power amplifier, a first frequency doubler, a second frequency doubler, and a low noise amplifier. The second signal source is connected to the input end of the second directional coupler. The output end of the second directional coupler is connected to the intermediate frequency end of the first mixer. The local oscillation end of the first mixer is connected to the input end of the second power amplifier. The radio frequency end of the first mixer is connected to the coupling of the first directional coupler. The output end of the second power amplifier is connected to the input end of the first frequency doubler. The output end of the first frequency doubler is connected to the local oscillation end of the second mixer. The radio frequency end of the second mixer is connected to the receiving antenna. The intermediate frequency of the second mixer is connected to the radio frequency end of the third mixer. The coupling end of the second directional coupler is connected to the input end of the third power amplifier. The output end of the third power amplifier is connected to the input end of the second frequency doubler. The output end of the second frequency doubler is connected to the local oscillation end of the third mixer. The intermediate frequency of the second frequency doubler is connected to the input end of the low noise amplifier. The output end of the low noise amplifier is connected to an image processing device.

The millimeter-wave reception link 22 conducts down-conversion on the received echo signals twice and transmits it to the image processing device 23, which reduces the difficulty of image post processing to facilitate establishing a three-dimensional image of the to-be-detected object. Echo signals processed by the millimeter-wave reception link 22 eliminate the problem of unsynchronized phase caused by introducing incoherent double signal sources in the millimeter wave transceiving link.

The image processing device 23 is configured to generate a three-dimensional image of the to-be-detected object according to the image data. The image processing device 23 receives the image data processed by the millimeter-wave reception link 22, conducts Fourier Transform on the image data according to the geometrical characteristic of the to-be-detected object, and conducts inverse Fourier Transform to construct the three-dimensional image of the to-be-detected object.

During the procedure of conducting security inspection on the to-be-detected object by the omni-directional security detection system, the to-be-detected object could be a person and/or an item. The millimeter array antenna transmits millimeter wave detection signals from four angles (up, down, left, right or up, down, front, back) of the to-be-detected object to detect it, which can obtain the three-dimensional information of the to-be-detected object adequately. A three-dimensional image of the to-be-detected object is generated after the omni-directional security detection system. Security staff can check whether banned item is carried by the to-be-detected object according to the three-dimensional image. The three-dimensional image is clear, visual and free of dead corner, which improves the accuracy of security inspection, and is convenient and efficient. The omni-directional security detection system is simple in structure and needs no complex control algorithm to implement. The omni-directional security detection system is low in cost and strong practicality.

In one embodiment, the omni-directional security detection system also comprises a drive device 25, a motion control device 24, and a plurality of guide rails 11. Each guide rail 11 is disposed on one surface of the support frame 10, and each of four surfaces is respectively disposed one guide rail 11. The antenna substrates 12 are respectively disposed on the guide rails 11. The motion control device 24 is configured to control the drive device 25 to drive the antenna substrates 12 of the plurality of millimeter wave array antennas 21 to move along the guide rails 11. The drive device 25 may be a drive motor, and the number of drive motors is four, which respectively drive the four millimeter wave array antennas to move along the guide rails 11 thereof.

In one embodiment, the guide rail 11 on the bottom surface is parallel to the guide rail 11 on the top surface, and the guide rail 11 on the first side face is parallel to the guide rail 11 on the second side face.

Besides, the plurality of millimeter-wave array antennas 21 can be fixed on the side faces of the support frame 10. By adding the number of transmission antennas and receiving antennas, the millimeter wave antennas disposed on each side face of the support frame 10 can obtain the image data of the corresponding angle of the to-be-detected object in one effort, so as to construct the three-dimensional image thereof. The millimeter wave array antennas can move without the control of a drive device, image at a time, which can improve the efficiency of security inspection.

In one embodiment, the motion control device 24 is also configured to control the antenna substrates 12 of the first millimeter wave array antenna 211 and the second millimeter wave array antenna 212 to move along the guide rails 11 oppositely, and control the antenna substrates 12 of the third millimeter wave array antenna 213 and the fourth millimeter wave array antenna 214 to move along the guide rails 11 oppositely. Controlling the millimeter wave array antennas disposed oppositely to move reversely can reduce the interference when the millimeter wave array antennas transmit and receive signals. For example, the first millimeter wave array antenna 211 transmits a millimeter wave signal from the right side of the to-be-detected object; the second millimeter wave array antenna 212 transmits a millimeter wave signal from the left side of the to-be-detected object. If the two signals are transmitted from the position facing the to-be-detected object simultaneously, the received echo signal may be peppered with the transmitting signal and/or echo signal from the other side. If the millimeter wave array antennas disposed oppositely move reversely, the two millimeter wave array antennas will be directly opposite only for a short time and the interference in the transmission and receiving signals is small.

In one embodiment, the motion control device 24 is also configured to control the antenna substrates 12 of the first millimeter wave array antenna 211 and the second millimeter wave array antenna 212 to move along the guide rails 11 in sequence, and control the antenna substrates 12 of the third millimeter wave array antenna 213 and the fourth millimeter wave array antenna 214 to move along the guide rails 11 in sequence. Similarly, if the millimeter wave array antennas disposed oppositely move in the same direction in sequence, the two millimeter wave array antennas will not be directly opposite, so the interference in the transmission and receiving signals is small, which improves the imaging quality of the omni-directional security detection system.

In one embodiment, the omni-directional security detection system also comprises a plurality of millimeter wave array switches 26, which are connected to the plurality of millimeter-wave array antennas 21 correspondingly to control the turn-on and turn-off of each antenna of the plurality of millimeter-wave array antennas 21. Each of the millimeter wave array switches 26 comprises a plurality of switches, and each switch is connected to each antenna of the millimeter wave array correspondingly.

In one embodiment, the omni-directional security detection system also comprises a scanning control device 27, which is configured to control the plurality of millimeter wave array switches 26, so that the plurality of millimeter-wave array antennas 21 transmit the millimeter wave transmission signals in sequence according to preset time sequence or receive echo signals reflected from the to-be-detected object in sequence. Controlling each millimeter wave array antenna's transmitting and receiving signals by a scanning way can reduce the interference during transmitting and receiving signals of multiple transmission antennas or multiple receiving antennas at the same millimeter wave array antenna, so as to improve the imaging quality.

In one embodiment, the scanning control device 27 is also configured to control the up and down millimeter wave array antennas formed by the first millimeter wave array antenna 211 and the second millimeter wave array antenna 212 and the left and right millimeter wave array antennas formed by the third millimeter wave array antenna 213 and the fourth millimeter wave array antenna 214 to transmit the millimeter wave transmission signals according to a preset time interval and receive the echo signals. In order to reduce the interference among different millimeter wave array antennas' transmission and receiving signals during omni-directional detection, a time interval is introduced between collecting the image information of the to-be-detected object from the up-and-down angle and collecting the image information of the to-be-detected object from the front-and-back angle. That is, the up and down millimeter wave array antennas and the left and right millimeter wave array antennas transmit and receive signals non-simultaneously. The two also transmit and receive signals by a scanning way according to preset time interval to improve the imaging quality of the three-dimensional image of the to-be-detected object.

In one embodiment, the omni-directional security detection system also comprises a display 28, which is configured to display the three-dimensional image for security staff's check.

In one embodiment, the omni-directional security detection system also comprises an alarm device 29, which is configured to alarm when the omni-directional security detection system has detected a banned item carried by the to-be-detected object.

The security detection apparatus can work in the following two working modes:

a. when conducting security detection on a human body, the security detection apparatus will alarm if it has detected a banned item carried by the human body;

b. when conducting security detection on a thing, the security detection apparatus will not alarm if it has detected a banned item carried by the thing, and the security staff will judge it according to image on the display 28. At the same time, in this mode, a corresponding judge algorithm is set so that a software program can give a label of a suspicious region for the security staff's reference.

In the omni-directional security detection system, the plurality of millimeter-wave array antennas 21 are disposed on the support frame 10, for transmitting millimeter-wave transmission signals from different angles to a to-be-detected object and receiving echo signals reflected from the to-be-detected object from different angles. The millimeter-wave reception link 22 processes the echo signals to obtain the image data of the to-be-detected object and obtain a three-dimensional image thereof. The millimeter-wave array antennas can be driven by a motor to move along the guide rails 11 for achieving the omni-directional security detection of the to-be-detected object. The three-dimensional image of the to-be-detected object can be achieved in one effort by adding the number fixed arrangement of antennas. During detecting the to-be-detected object, the scanning control device 27 is used to the plurality of millimeter-wave array antennas 21, transmission antennas in a same millimeter-wave array antenna, and receiving antennas in a same millimeter-wave array antenna to transmit and receive information according to a certain time sequence to reduce the interference of signals to improve the three-dimensional imaging quality. The imaging result is displayed. The alarm device 29 will if a banned item carried in the to-be-detected object has been detected. The omni-directional security detection system can achieve omni-directional detection of the to-be-detected object, can detect human and objects at the same time, and is convenient, quick, highly accurate, simple in structure and low in cost.

The technical features of the above described embodiments can be combined arbitrarily, and for simplicity, not all possible combinations of technical features of the above embodiments are described. However, all the combinations of these technical features, as long as they are not conflictive, should be regarded as being within the scope of this disclosure.

The above embodiments merely express several implementation ways of this disclosure. The description is specific and in detail, but it should not be construed as a limit to this disclosure. It should be noted that, without departing from the spirit of this disclosure, persons skilled in the art can make various modifications or alternatives, which all belong to the scope of this disclosure. Therefore, the technical scope of this disclosure must be determined according to the scope of the accompanying claims.

The invention claimed is:

1. A millimeter wave imaging-based omni-directional security detection system, comprising:
   a support frame, including a plurality of surfaces;
   a millimeter-wave transmission link, configured to generating a millimeter-wave transmission signal;
   a plurality of millimeter-wave array antennas, disposed on different surfaces of the support frame, configured to transmit millimeter-wave transmission signals from different angles to a to- be-detected object and receive echo signals reflected from the to-be-detected object;
   a millimeter-wave reception link, configured to process the echo signals and transform the echo signals to the image data of the to-be-detected object;
   an image processing module, configured to generate a three-dimensional image of the to-be-detected object according to the image data;
   wherein the support frame comprises a bottom surface, a top surface, a first side face, and a second side face, each of which is disposed with an antenna substrate; the first side face and the second side face are opposite; the plurality of millimeter-wave array antennas comprise a first millimeter wave array antenna disposed on the antenna substrate of the first side face, a second millimeter wave array antenna disposed on the antenna substrate of the second side face, a third millimeter wave array antenna disposed on the antenna substrate of the top surface, and a fourth millimeter wave array antenna disposed on the antenna substrate of the bottom surface; the millimeter-wave transmission link and the millimeter-wave reception link forms four sets of millimeter wave transceiving links, and each millimeter wave transceiving link is respectively disposed on the antenna substrate of each surface of the support frame, and the omni-directional security detection system further comprises a drive device, a motion control module, and a plurality of guide rails; each guide rail is disposed on one surface of the support frame; each antenna substrate is disposed on one guide rail; the motion control module is configured to control the drive device to drive the antenna substrates of the plurality of millimeter wave array antennas to move along the guide rails.

2. The omni-directional security detection system of claim 1, wherein the guide rail on the bottom surface is parallel to the guide rail on the top surface, and the guide rail on the first side face is parallel to the guide rail on the second side face.

3. The omni-directional security detection system of claim 1, wherein the motion control module is also configured to control the antenna substrates of the first millimeter wave array antenna and the second millimeter wave array antenna to move along the guide rails oppositely, and control the antenna substrates of the third millimeter wave array antenna and the fourth millimeter wave array antenna to move along the guide rails oppositely.

4. The omni-directional security detection system of claim 1, wherein the motion control module is also configured to control the antenna substrates of the first millimeter wave array antenna and the second millimeter wave array antenna to move along the guide rails in sequence, and control the antenna substrates of the third millimeter wave array antenna and the fourth millimeter wave array antenna to move along the guide rails in sequence.

5. The omni-directional security detection system of claim 1, further comprising a plurality of millimeter wave array switches, which are connected to the plurality of millimeter-wave array antennas correspondingly to control the turn-on and turn-off of each antenna of the plurality of millimeter-wave array antennas.

6. The omni-directional security detection system of claim 5, further comprising a scanning control module, which is configured to control the plurality of millimeter wave array switches so that the plurality of millimeter-wave array antennas transmit the millimeter wave transmission signals in sequence according to preset time sequence or receive echo signals reflected from the to-be-detected object in sequence.

7. The omni-directional security detection system of claim 6, wherein the scanning control module is also configured to control the up and down millimeter wave array antennas formed by the first millimeter wave array antenna and the second millimeter wave array antenna and the left and right millimeter wave array antennas formed by the third millimeter wave array antenna and the fourth millimeter wave array antenna to transmit the millimeter wave transmission signals according to a preset time interval and receive the echo signals.

8. The omni-directional security detection system of claim 1, characterized in that, further comprising a display, which is configured to display the three-dimensional image.

9. The omni-directional security detection system of claim 1, characterized in that, further comprising an alarm module, which is configured to alarm when the omni-directional security detection system has detected a banned item carried by the to-be-detected object.

* * * * *